2,735,053

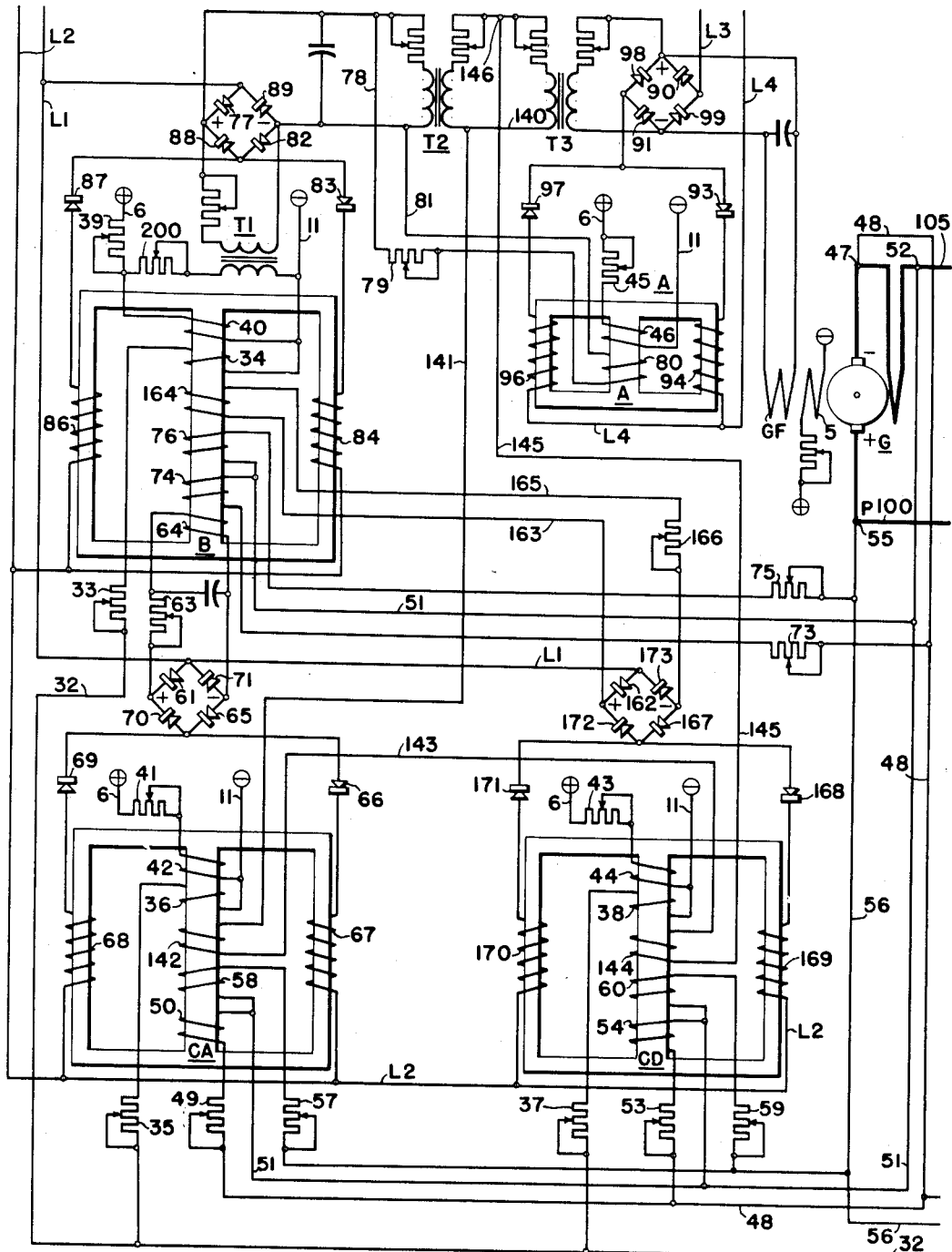
Fig. IA.

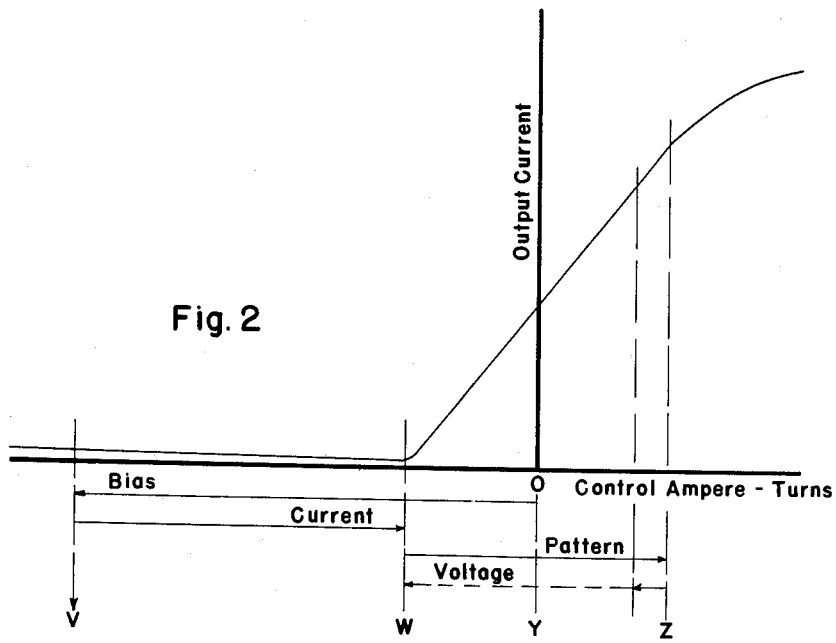
Fig. 2
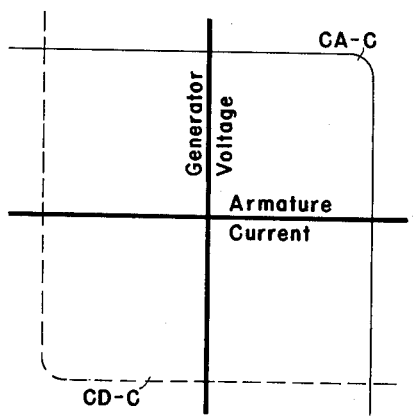
Fig. 3.
Fig. 4.
| Control Switch Sequence | | | | | |
|---|---|---|---|---|---|
| Contact | Inch | Off | Rider Start | Slow | Run |
| 112 | | | ○ | ○ | ○ |
| 122 | | | | ○ | ○ |
| 23 | ○ | | | | |
| 127 | | | | | ○ |
| 123 | | | | ○ | |
| 124 | | | | | ○ |
| 31 | ○ | | | | |
Spring Return From Inch United States Patent Office 2,735,053
Patented Feb. 14, 1956

MAGNETIC AMPLIFIER REGULATED CURRENT LIMIT CONTROL FOR WARD LEONARD SYSTEMS

Charlton H. Storey, Jr., Buffalo, and William T. Hunt, Jr., New York, N. Y., assignors to Westinghouse Electric Corporation, East Pittsburgh, Pa., a corporation of Pennsylvania Application February 27, 1953, Serial No. 339,436

16 Claims. (Cl. 318—143)

Our invention relates to electric control systems and more particularly to magnetic amplifier regulated electric control systems for Ward-Leonard drives.

In many fields of application where a motor is called upon to drive a high inertia load, current limit control for the armature circuit of the driving motor is a very desirable feature. One typical example is in connection with a winder and slitter drive in the paper industry. Another example is in the operation of steel mill auxiliaries where current limit control for the load operating motor is rather important.

In the past such current limit control was accomplished by the use of a suitable biasing source interconnected with a current limit field of a regulating generator. In some other control systems magnetic amplifiers were combined with a voltage regulating generator. A control of this last-mentioned type may be found in the copending application of William T. Hunt, Jr., filed January 30, 1952, Serial No. 334,264 and entitled Magamp Current Limit.

One broad object of our invention is the provision of a magnetic amplifier regulated control for the main generator of a Ward-Leonard drive.

Another broad object of our invention is the provision of current limit control for a motor operating a load wherein the current limit is effected by magnetic amplifiers without the use of any regulating generator.

A more specific object of our invention is the provision of a control involving magnetic amplifiers only for substantially directly so controlling the voltage of a main generator that the motor armature current, of a motor connected in a loop circuit with the main generator, does not rise appreciably above the rated motor armature current.

Other objects and advantages of our invention will become more apparent from a study of the following specification and the accompanying drawings, in which:

Figures 1A and 1B together illustrate our invention diagrammatically as applied to and combined with a winder and slitter drive for paper;

Fig. 2 shows the characteristic transfer curve of a magnetic amplifier;

Fig. 3 shows the curves illustrating the changes in main generator voltage with changes in motor armature current, both for the accelerating and the decelerating periods of the motor; and Fig. 4 shows a sequence chart of the control operations of our invention in combination with a paper winder and slitter.

Figure 1B:
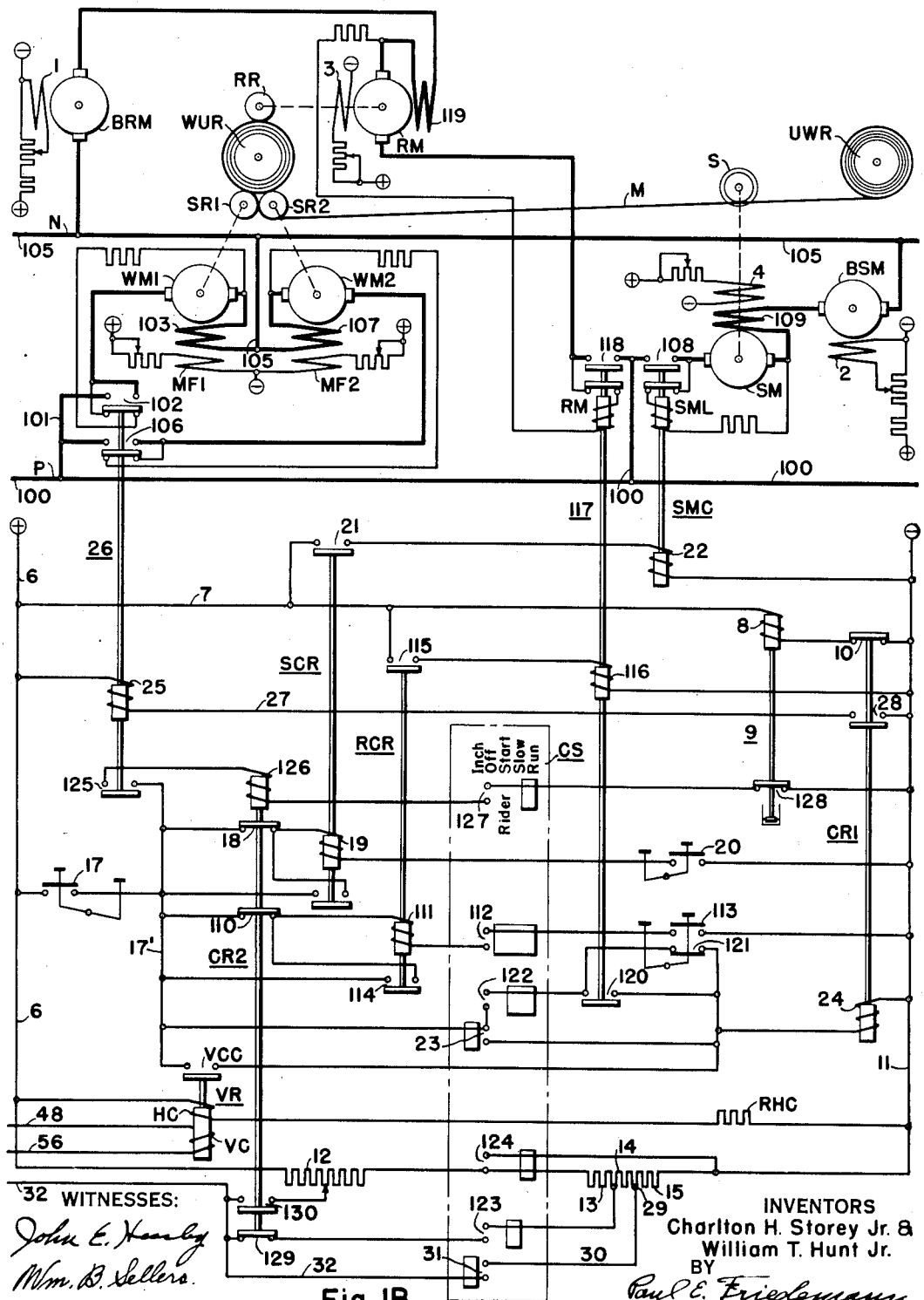

In Figs. 1A and 1B the main generator G is shown connected in loop circuits with a plurality of load driving motors, namely the winder motors WM1 and WM2, the rider-roll motor RM, or motors when two are used as is usually the case, and the slitter motor SM. A booster generator BRM is connected in series with the rider-roll motor RM and a booster BSM is connected in series with the slitter motor SM.

All of these dynamoelectric machines, namely, the generators G, BRM and BSM and the motors WM1, WM2, RM, and SM are provided with separately excited field windings 5, 1, and 2, and MF1, MF2, 3, and 4. The control of the excitation of the field windings 1, 2, 3, 4, 5, MF1 and MF2 is not part of our invention, and we have, therefore, shown these field windings connected to suitable sources of constant voltage direct current supply terminals. Our control system is primarily directed to the control of the excitation of the field winding GF of the main generator G.

The generator field winding GF is connected to the output circuit of the magnetic amplifier A. This magnetic amplifier A, which is a third stage magnetic amplifier, has a bias winding 46, a control winding 80, and the two main windings 94 and 96.

The control winding 80 is connected in the output circuit of the second stage magnetic amplifier B. This magnetic amplifier B has a bias winding 40, a pattern winding 34, two current limit control windings 64 and 164, a voltage winding 76, an IR drop winding 74, and the two main windings 84 and 86 for supplying the input to the winding of the magnetic amplifier A. Current limit control winding 64 of the magnetic amplifier B is connected to the output circuit of the accelerating current limit magnetic amplifier CA and the other current limit control winding 164 is connected to the output circuit of the decelerating current limit magnetic amplifier CD. The magnetic amplifiers CA and CD are first stage magnetic amplifiers.

A better understanding of our invention may be had from a study of typical operating cycles of the combination to which our invention is supplied.

Let the assumption be that all the terminals shown are appropriately energized and that all the generators are driven by suitable prime movers not shown. All the field windings, mentioned except GF, will be energized, all the bias windings for the magnetic amplifiers will be energized, and the control leads 6 and 11 will be energized.

When leads 6 and 11 are energized a circuit is established from positive lead 6, through conductor 7, actuating coil 8 of the time limit relay 9, back contacts 10 of the control relay CR1 to the negative lead 11. The time limit relay operates substantially instantly to open contacts 128. When coil 8 of the time limit relay 9 is deenergized, the contacts 128 close only after the lapse of a selected time interval.

Another circuit is established from the positive conductor 6, through the resistor sections 12, 13, 14, and 15 to the negative lead 11. The utility of this circuit will become apparent as the description proceeds.

If the windup-reel WUR is empty and the unwind-reel UWR full and the material M is not yet threaded through the slitter and over the rolls of the surface winder then a slow winding or inching speed is desirable. Further, since the slitter knives must rotate when threading material, it is important that the slitter S be started before the motors WM1 and WM2 are started. Switch 20 is thus operated to closed position and remains in the closed position, and the controller switch CS is moved to the left for inching operation. Switch 17 is now moved to closed position and a circuit is established from lead 6 through switch 17 to conductor 17', back contacts 18 of control relay CR2, actuating coil 19 of the slitter control relay SCR, switch 20 to the negative lead 11. Control relay SCR thus operates to close contacts 21 to energize the actuating coil 22 of the slitter motor contactor SMC.

Another circuit is established from lead 6 through switch 17 to conductor 17', switch contacts 23 of the controller switch CS and actuating coil 24 of the control relay CR1 to negative lead 11. Operation of control relay CR1 effects the closing of contacts 28 to thus establish a circuit from lead 6 through the actuating coil 25 of the winder motor contactor 26, conductor 27, and contacts 28 to lead 11.

Since the controller switch CS, is in the inch position a circuit is established from the junction 29 through conductor 30, controller switch 31 to conductor 32. Since the junction 29 is separated from the negative lead by the resistor 15 only it is apparent that conductor 32 is of positive potential but of rather low voltage.

The pattern windings 34, 36 and 38, connected in series with the adjustable resistors 33, 35 and 37, respectively, are connected in parallel from conductor 32 across resistor section 15 to the negative lead 11. (See Fig. 1A.)

The bias windings 40, 42, 44 and 46, connected in series with adjustable resistors 39, 41, 43 and 45, respectively, are all connected in parallel across leads 6 and 11.

The magnetic amplifier CA has a control winding 50 responsive to the current in the generator armature circuit. The circuit for this winding may be traced from the negative junction 47 through conductor 48, adjustable resistor 49, "current" winding 50, conductor 51 to the less negative junction 52.

The magnetic amplifier CD also has a current winding 54. The circuit for this current winding 54 may be traced from conductor 48 through adjustable resistor 53, current winding 54 to conductor 51. Since the magnetic amplifier CD is provided to effect current limit control during deceleration, and for reverse operation, namely when junction 52 is negative with respect to junction 47, the current winding 54 is so wound on the core of the magnetic amplifier CD as to reduce the output of this magnetic amplifier with rise in current value through winding 54.

The magnetic amplifier CA also has a voltage winding 58. The circuit for this winding may be traced from the positive terminal or junction 55 of generator G through conductor 56, adjustable resistor 57, voltage winding 58 to conductor 51. A similar circuit including adjustable resistor 59 and the voltage winding 60 is provided for the amplifier CD.

Since the current winding 50 and the voltage winding 58 are both substantially unexcited at the moment, the output of magnetic amplifier CA is very low, as at point W of Fig. 2, the control winding 64 of the magnetic amplifier B is excited at a rather low value. The output circuit for magnetic amplifier CA may be traced from the alternating current lead L1, when this lead is positive, through rectifier 61, adjustable resistor 63, control winding 64, rectifiers 65 and 66, main winding 67 to lead L2, and from lead L2, when this lead is positive, through main winding 68, rectifiers 69 and 70, adjustable resistor 63, control winding 64 and rectifier 71 to lead L1.

The second stage magnetic amplifier also has control windings 74 and 76 that are responsive respectively to the armature current and voltage of the generator G. The circuit for the current winding 74 may be traced from conductor 48 through adjustable resistor 73, current coil 74 to conductor 51, and the circuit for the voltage winding 76 may be traced from junction 55 through the adjustable resistor 75, voltage winding 76 to conductor 51.

Since the control winding 64 is energized at a rather low value and the current and voltage windings 74 and 76 are substantially unenergized at the operating condition under consideration, the output of magnetic amplifier B is rather low. The output from this magnetic amplifier is supplied to the power magnetic amplifier A. The circuit may be traced from lead L1, when this lead is positive, through rectifier 77, conductor 78, adjustable resistor 79, control winding 80, conductor 81, rectifiers 82 and 83, main winding 84 to lead L2, and from lead L2, when this lead is positive, through main winding 86, rectifiers 87 and 88, conductor 78, adjustable resistor 79, control winding 80, conductor 81, and rectifier 89 to lead L1.

The output of the power magnetic amplifier A is supplied directly to the generator field winding GF. The circuit may be traced from lead L3, when this lead is positive, through rectifier 90, field winding GF, rectifiers 91 and 93, main winding 94 to lead L4, and from lead L4, when this lead is positive, through main winding 96, rectifiers 97 and 98, the generator field winding GF, and rectifier 99 to lead L3.

For the conditions of operation under discussion the field GF is excited at a low value and the motors coupled to the generator G will operate at inching speed. The only motors connected to the generator at the moment are the winder motors and the slitter motor. This is so because as hereinabove explained the contactors SMC and 26 are in operated position.

When the contactor 26 operated a circuit was established from the positive terminal, or junction 55, of the generator G through conductors 100 and 101, contacts 102 of contactor 26, the armature of winder motor WM1, the series field winding 103 to the negative conductor 105. The armature of the winder motor WM2 is connected in a parallel circuit that may be traced from conductor 100 through contacts 106 of contactor 26, the armature of motor WM2 and the series field winding 107 to the negative conductor 105.

The circuit for the slitter motor is traced from conductor 100 through contacts 108 of contactor SMC, the armature winding of the slitter motor SM, the series field winding 109 and the armature of the booster generator BSM to the negative conductor 105.

The motors WM1, WM2, and SM thus operate at inching speed to thread the material M through the slitter S and over the surface rolls SR1 and SR2 onto the windup reel WUR. If the speed is too fast, or for some reasons an especially low speed is needed on the drive, switch 17 may be operated intermittently to thus alternately connect and disconnect the winder motors and slitter motor.

As the material M is passed over the windup reel and is to be passed under the rider-roll RR the rider roll motor is to be started. This is accomplished by depressing switch 113 and moving the controller switch CS to the "Rider start" position. A circuit is then established from conductor 17', through back contacts 110 of control relay CR2, the actuating coil 111 of the rider roll control relay RCR, controller contacts 112, switch contacts 113 to the negative conductor 11. Relay RCR after it has operated holds itself in through contacts 114 and closes contacts 115.

The closure of contacts 115 establishes a circuit from conductor 7 through contacts 115, actuating coil 116 of the contactor 117 to the negative conductor 11. The operation of contactor 117 closes the contacts 118 to establish a circuit from conductor 100 through contacts 118, the armature winding of motor RM, series field 119, the armature winding of the booster generator BRM to conductor 105. The rider roll motor thus operates at inching speed to permit the threading of the material under the rider roll RR.

It is normally not necessary to drive the rider roll during inching. To positively drive it, as here pointed out does aid in the threading operation.

The operation of the contactor 117 also closes the contacts 120. By releasing switch 113, the contacts 121 are closed. Control relay CR1 may thus be energized through the controller switch contacts 122. This is only of importance if the apparatus had been at rest and the material M in the machine and no preliminary inching operation is necessary and the controller switch CS had been moved directly to the slow speed position.

For the sequence of operation being discussed the control relay CR1 remains picked up. This will be apparent from the following paragraph.

When leads 6 and 11 are energized the holding coil HC of the VR relay is connected to these leads through the resistor RHC. The resistance value of this resistor RHC is so chosen that the VR relay does not pick up.

However, when the voltage coil VC, connected across the conductors 48 and 56 and thus responsive to the voltage of the generator G, is energized, the VR relay picks up to close contacts VCC. This means that during inching operation the VR relay picks up. Thereafter the energization of coil 24 of the control relay CR1 is independent of the controller switch contacts 23.

When the controller switch CS is moved to the "Slow" position the actuating coil 24 of the control relay CR1 is provided with a holding circuit through contacts 121 and 122. The contacts 123 are also closed. This means that conductor 32, now being connected between resistors 13 and 14 through contacts 123 and 129, is made more positive. The excitation of field GF is thus increased somewhat to operate the motors connected to generator G at somewhat higher than inching speed but still at a slow speed.

If full running speed is desired the controller is moved to the "Run" position, whereupon a circuit is established through switch contacts 124, and the shunt across resistor sections 13, 14 and 15 to thus increase the excitation of the generator G.

Since switch contacts 127 are also closed by the operation of the controller to the "Run" position and since the contacts 128 of the time limit relay 9 are closed, a circuit is established from conductor 17' through contacts 125 of the contactor 26, actuating coil 126 of control relay CR2, contacts 127 and 128 to the lead 11. The operation of control relay CR2 effects the opening of contacts 18, 110, and 129 and the closing of contacts 130. The conductor 32 is thus excited at maximum positive value which means that the windings 34, 36, and 38 of the amplifiers B, CA, and CD, respectively are excited at maximum value. The result is that the generator field winding GF is excited at maximum value to cause the machine elements to operate at maximum speed.

Conductor 32 is positive by an amount determined by the adjustment of potentiometer 12, which adjustment is controlled manually by the operator. The operator can thus determine at what speed the winder will run.

When no inching operation precedes the starting operation and the controller CS is moved from the "Off" position through the "Rider start" and the "Slow" positions to the "Run" position, then resistor sections 14 and 15, and then 13 are shunted in the sequence named, and after the lapse of a selected interval of time, as determined by time limit relay 9, a portion of resistor 12 is shunted. The speed increase is thus effected in three distinct steps.

In a drive of the kind shown the total accelerating load on the generator is likely to be large, because the WR² is large, and in consequence, the generator armature current required to accelerate the motors at the rate the main generator voltage is increasing is likely to be excessive. To limit the current to safe values the magnetic amplifiers are controlled as a function of generator armature current and generator voltage.

Fig. 2 shows the characteristic transfer curve of a magnetic amplifier, as the magnetic amplifier CA. When the bias winding 42 alone is excited the magnetic amplifier operates at point V of the showing in Fig. 2. The use of the current winding 50, the pattern winding 36, and the voltage windings 58 is to obtain current limit control during acceleration, or for that matter at any time when the generator armature current exceeds a selected value.

When the generator armature current is near the desired upper limit, the ampere turns in the current winding 50 will cause the magnetic amplifier CA to operate at point W. (See Fig. 2.) The pattern winding 36 is wound to bring the operation of the magnetic amplifier to point Z. This point Z is selected on the straight portion of the curve. At point Z the output of the accelerating control amplifier CA is high enough to produce, in the current control winding 64 of magnetic amplifier B, enough ampere turns to balance the ampere turns of the pattern winding 34. As the motors WM1 and WM2, connected to the generator will accelerate when the current is limited at its maximum value, the back electromotive force of the motor begins to increase. This would tend to decrease the armature current, and ampere turns would begin to appear in the voltage windings 58 and 76. The output of magnetic amplifier CA is then varied in accordance with the difference between the effect of the pattern winding 36 and the voltage winding 58. As this is chosen on the straight portion of the curve, the output is just the right amount to balance the difference between the pattern and voltage winding ampere turns and the net ampere turns in amplifier B. The net ampere-turns are those required to maintain an output. The maximum pattern winding ampere-turns will usually be several times larger than the net ampere-turns. The output characteristics of this drive with full pattern winding excitation is shown in Fig. 3 by the curve CA—C.

When the pattern and voltage excitations on CA balance, the output of winding 64 will be back to minimum, and the pattern and voltage excitations on B will balance with just the net excitation remaining and the generator armature current can then decrease. Our drive then operates as a voltage regulator, with the current limit out of the picture because the output of amplifier CA is a minimum.

For deceleration, or reverse acceleration, the magnetic amplifier CD goes into action. Winding 64 is not energized but winding 164 as the output of magnetic amplifier CD, is energized. The output circuit for the magnetic amplifier CD may be traced from lead L1, when this lead is positive, through rectifier 162, conductor 163, control winding 164, conductor 165, adjustable resistor 166, rectifiers 167 and 168, main winding 169, to lead L2, and from lead L2, when this lead is positive, through the main winding 170, rectifiers 171 and 172, conductor 163, control winding 164, conductor 165, adjustable resistor 166 and rectifier 173 to lead L1. This amplifier CD, being responsive to a reverse armature current and reverse voltage now effects the control illustrated by curve CD—C shown in Fig. 3. The control is thus effective in all four quadrants.

A damping transformer T1 and T2 are responsive to rapid changes in the output of amplifier B. The damping transformer T3 is responsive to rapid changes in the output of amplifier A. The output of the damping transformer T1 appears in the circuit that may be traced through resistor 200 and winding 40 of amplifier B. The output of the damping transformers T2 and T3 appears in the circuit that may be traced through the conductor 141, damping winding 142 on magnetic amplifier CA, conductor 143, damping winding 144 on magnetic amplifier CD and conductor 145 to the upper common secondary terminal 146 of the transformers T2 and T3. These damping transformers provide stabilizing feedback circuits to insure good stability which is of particular value when high gains are used, as will often be the case.

The capacitors shown connected across the primary windings of damping transformers T2 and T3 and the capacitor connected across the control coil, or winding, 64 prevents ripples from appearing across these windings and thus improves the performance of our system.

Fig. 2, as shown, will apply to the magnetic amplifier CA while on magnetic amplifier CD the direction, or polarity, of the pattern and voltage coils is reversed from that shown. The value of this scheme lies in the fact that the output of the current limit magnetic amplifiers is continuously recalibrated during a speed change so that the armature current remains constant as is indicated by the vertical slope of the current curve in Fig. 3.

While we have shown and described but one embodiment of our invention and one application thereof, it is understood that our invention is capable of various adaptations and applications and that changes and modifications may be made which all come within the spirit of our invention.

We claim as our invention:

1. In a system of control for dynamoelectric machines, in combination, a main generator having an armature winding and a field winding the excitation of which is to be controlled, at least one motor connected to the generator to thus be operated in accordance with the voltage of said generator, a self-saturating final-stage magnetic amplifier having main windings connected to energize the generator field winding and having a bias winding and a control winding, magnetic amplifier means, responsive to the generator armature current and the generator voltage, connected to energize the control winding of the self-saturating final-stage magnetic amplifier to thus control the excitation of the generator field winding, and damping transformer means, responsive to the rate of output of the self-saturating magnetic amplifier and the output of the magnetic amplifier means for controlling the output of the magnetic amplifier means.

2. In a system of control for a winder drive, in combination, a main generator having an armature winding and a field winding the excitation of which is to be controlled, a plurality of motors disposed to be connected to the armature winding of the generator, controller means for effecting the connection of the motors in selected sequence to the generator armature winding, a self-saturating third-stage magnetic amplifier having main windings connected to suitably energized alternating-current terminals and connected to the generator field to thus effect the energization of the field winding as a function of the output of the magnetic amplifier, said magnetic amplifier having a control winding, a self-saturating second-stage magnetic amplifier having main windings connected to suitably energized alternating-current terminals and connected to the control winding of the third-stage magnetic amplifier, said second-stage magnetic amplifier having a control winding, a self-saturating first-stage magnetic amplifier having main windings connected to suitably energized alternating-current terminals and connected to the control winding of the second-stage magnetic amplifier, said first-stage magnetic amplifier having a control winding responsive to the voltage of the generator.

3. In a system of control for a winder drive, in combination, a main generator having an armature winding and a field winding the excitation of which is to be controlled, a plurality of motors disposed to be connected to the armature winding of the generator, controller means for effecting the connection of the motors in selected sequence to the generator armature winding, a self-saturating third-stage magnetic amplifier having main windings connected to suitably energized alternating-current terminals and connected to the generator field to thus effect the energization of the field winding as a function of the output of the magnetic amplifier, said magnetic amplifier having a control winding, a self-saturating second-stage magnetic amplifier having main windings connected to suitably energized alternating-current terminals and connected to the control winding of the third-stage magnetic amplifier, said second-stage magnetic amplifier having a first control winding, and a second control winding, a self-saturating first first-stage magnetic amplifier having main windings connected to suitably energized alternating-current terminals and connected to one of the control windings of the second-stage magnetic amplifier, said first first-stage magnetic amplifier having a control winding responsive to the voltage of the generator, a second first-stage magnetic amplifier having main windings connected to suitably energized alternating-current terminals and connected to the second control winding of the second-stage magnetic amplifier, said second first-stage magnetic amplifier having a control winding responsive to the reverse voltage of the generator.

4. In a system of control for a winder drive, in combination, a main generator having an armature winding and a field winding the excitation of which is to be controlled, a plurality of motors disposed to be connected to the armature winding of the generator, controller means for effecting the connection of the motors in selected sequence to the generator armature winding, a self-saturating third-stage magnetic amplifier having main windings connected to suitably energized alternating-current terminals and connected to the generator field to thus effect the energization of the field winding as a function of the output of the magnetic amplifier, said magnetic amplifier having a control winding, a self-saturating second-stage magnetic amplifier having main windings connected to suitably energized alternating-current terminals and connected to the control winding of the third-stage magnetic amplifier, said second-stage magnetic amplifier having a control winding and a winding responsive to the generator armature current, a self-saturating first-stage magnetic amplifier having main windings connected to suitably energized alternating-current terminals and connected to the control winding of the second-stage magnetic amplifier, said first-stage magnetic amplifier having a control winding responsive to the voltage of the generator.

5. In a system of control for a winder drive, in combination, a main generator having an armature winding and a field winding the excitation of which is to be controlled, a plurality of motors disposed to be connected to the armature winding of the generator, controller means for effecting the connection of the motors in selected sequence to the generator armature winding, a self-saturating third-stage magnetic amplifier having main windings connected to suitably energized alternating-current terminals and connected to the generator field to thus effect the energization of the field winding as a function of the output of the magnetic amplifier, said magnetic amplifier having a control winding, a self-saturating second-stage magnetic amplifier having main windings connected to suitably energized alternating-current terminals and connected to the control winding of the third-stage magnetic amplifier, said second-stage magnetic amplifier having a control winding, a self-saturating first-stage magnetic amplifier having main windings connected to suitably energized alternating-current terminals and connected to the control winding of the second-stage magnetic amplifier, said first-stage magnetic amplifier having a control winding responsive to the voltage of the generator and having a second control winding responsive to the armature current of the generator.

6. In a system of control for a winder drive, in combination, a main generator having an armature winding and a field winding the excitation of which is to be controlled, a plurality of motors disposed to be connected to the armature winding of the generator, controller means for effecting the connection of the motors in selected sequence to the generator armature winding, a self-saturating third-stage magnetic amplifier having main windings connected to suitably energized alternating-current terminals and connected to the generator field to thus effect the energization of the field winding as a function of the output of the magnetic amplifier, said magnetic amplifier having a control winding, a self-saturating second-stage magnetic amplifier having main windings connected to suitably energized alternating-current terminals and connected to the control winding of the third-stage magnetic amplifier, said second-stage magnetic amplifier having a control winding, a self-saturating first-stage magnetic amplifier having main windings connected to suitably energized alternating-current terminals and connected to the control winding of the second-stage magnetic amplifier, said first-stage magnetic amplifier having a control winding responsive to the voltage of the generator, and having a second control winding responsive to the reverse armature current of the generator.

7. In a system of control for a winder drive, in combination, a main generator having an armature winding and a field winding the excitation of which is to be controlled, a plurality of motors disposed to be connected to the armature winding of the generator, controller means for effecting the connection of the motors in selected sequence to the generator armature winding, a self-saturating third-stage magnetic amplifier having main windings connected to suitably energized alternating-current terminals and connected to the generator field to thus effect the energization of the field winding as a function of the output of the magnetic amplifier, said magnetic amplifier having a control winding, a self-saturating second-stage magnetic amplifier having main windings connected to suitably energized alternating-current terminals and connected to the control winding of the third-stage magnetic amplifier, said second-stage magnetic amplifier having a control winding, a self-saturating first-stage magnetic amplifier having main windings connected to suitably energized alternating-current terminals and connected to the control winding of the second-stage magnetic amplifier, said first-stage magnetic amplifier having a control winding responsive to the voltage of the generator, and damping transformer means responsive to the outputs of the first-mentioned magnetic amplifier and the second-stage magnetic amplifier for controlling the output rate of a first-stage magnetic amplifier.

8. In a system of control for a winder drive, in combination, a main generator having an armature winding and a field winding the excitation of which is to be controlled, a plurality of motors disposed to be connected to the armature winding of the generator, controller means for effecting the connection of the motors in selected sequence to the generator armature winding, a self-saturating third-stage magnetic amplifier having main windings connected to suitably energized alternating-current terminals and connected to the generator field to thus effect the energization of the field winding as a function of the output of the magnetic amplifier, said magnetic amplifier having a control winding, a self-saturating second-stage magnetic amplifier having main windings connected to suitably energized alternating-current terminals and connected to the control winding of the third-stage magnetic amplifier, said second-stage magnetic amplifier having a control winding, and having a winding responsive to the generator voltage, a self-saturating first-stage magnetic amplifier having main windings connected to suitably energized alternating-current terminals and connected to the control winding of the second-stage magnetic amplifier, said first-stage magnetic amplifier having a control winding responsive to the voltage of the generator.

9. In a system of control for a winder drive, in combination, a main generator having an armature winding and a field winding the excitation of which is to be controlled, a plurality of motors disposed to be connected to the armature winding of the generator, controller means for effecting the connection of the motors in selected sequence to the generator armature winding, a self-saturating third-stage magnetic amplifier having main windings connected to suitably energized alternating-current terminals and connected to the generator field to thus effect the energization of the field winding as a function of the output of the magnetic amplifier, said magnetic amplifier having a control winding, a self-saturating second-stage magnetic amplifier having main windings connected to suitably energized alternating-current terminals and connected to the control winding of the third-stage magnetic amplifier, said second-stage magnetic amplifier having a first control winding and a second control winding and a winding responsive to the generator armature current, a self-saturating first first-stage magnetic amplifier having main windings connected to suitably energized alternating-current terminals and connected to one of the control windings of the second-stage magnetic amplifier, said first first-stage magnetic amplifier having a control winding responsive to the voltage of the generator, a second first-stage magnetic amplifier having main windings connected to suitably energized alternating-current terminals and connected to the second control winding of the second-stage magnetic amplifier, said second first-stage magnetic amplifier having a control winding responsive to the reverse voltage of the generator.

10. In a system of control for a winder drive, in combination, a main generator having an armature winding and a field winding the excitation of which is to be controlled, a plurality of motors disposed to be connected to the armature winding of the generator, controller means for effecting the connection of the motors in selected sequence to the generator armature winding, a self-saturating third-stage magnetic amplifier having main windings connected to suitably energized alternating-current terminals and connected to the generator field to thus effect the energization of the field winding as a function of the output of the magnetic amplifier, said magnetic amplifier having a control winding, a self-saturating second-stage magnetic amplifier having main windings connected to suitably energized alternating-current terminals and connected to the control winding of the third-stage magnetic amplifier, said second-stage magnetic amplifier having a first control winding and a second control winding, a self-saturating first first-stage magnetic amplifier having main windings connected to suitably energized alternating-current terminals and connected to one of the control windings of the second stage magnetic amplifier, said first first-stage magnetic amplifier having a control winding responsive to the voltage of the generator and having a second control winding responsive to the armature current of the generator, a second first-stage magnetic amplifier having main windings connected to suitably energized alternating-current terminals and connected to the second control winding of the second-stage magnetic amplifier, said second first-stage magnetic amplifier having a control winding responsive to the reverse voltage of the generator.

11. In a system of control for a winder drive, in combination, a main generator having an armature winding and a field winding the excitation of which is to be controlled, a plurality of motors disposed to be connected to the armature winding of the generator, controller means for effecting the connection of the motors in selected sequence to the generator armature winding, a self-saturating third-stage magnetic amplifier having main windings connected to suitably energized alternating-current terminals and connected to the generator field to thus effect the energization of the field winding as a function of the output of the magnetic amplifier, said magnetic amplifier having a control winding, a self-saturating second-stage magnetic amplifier having main windings connected to suitably energized alternating-current terminals and connected to the control winding of the third-stage magnetic amplifier, said second-stage magnetic amplifier having a first control winding and a second control winding, a self-saturating first-stage magnetic amplifier having main windings connected to terminals energized from a suitable source of alternating current and connected to the first control winding of the second-stage magnetic amplifier, said first-stage magnetic amplifier having a control winding, and circuit means for connecting the second control winding of the second-stage magnetic amplifier and the control winding of the first-stage magnetic amplifier to be responsive to the voltage of the generator.

12. In a system of control for a winder drive, in combination, a main generator having an armature winding and a field winding the excitation of which is to be controlled, a plurality of motors disposed to be connected to the armature winding of the generator, controller means for effecting the connection of the motors in selected sequence to the generator armature winding, a self-saturating third-stage magnetic amplifier having main windings connected to suitably energized alternating-current terminals and connected to the generator field to thus effect the energization of the field winding as a function of the output of the magnetic amplifier, said magnetic amplifier having a control winding, a self-saturating second-stage magnetic amplifier having main windings connected to suitably energized alternating-current terminals and connected to the control winding of the third-stage magnetic amplifier, said second-stage magnetic amplifier having a first control winding, a second control winding, and a third control winding, a first-stage self-saturating magnetic amplifier having main windings connected to terminals energized from a suitable source of alternating current and being connected to the first control winding of the second-stage magnetic amplifier, said first-stage magnetic amplifier having a first control winding and a second control winding, circuit means for connecting the second control winding of the second-stage magnetic amplifier and the first control winding of the first-stage magnetic amplifier to be responsive to the generator voltage, circuit means for connecting the third control winding of the second-stage magnetic amplifier and the second control winding of the first-stage magnetic amplifier to be responsive to the generator armature current.

13. In a system of control for a winder drive, in combination, a main generator having an armature winding and a field winding the excitation of which is to be controlled, a plurality of motors disposed to be connected to the armature winding of the generator, controller means for effecting the connection of the motors in selected sequence to the generator armature winding, a self-saturating third-stage magnetic amplifier having main windings connected to suitably energized alternating-current terminals and connected to the generator field to thus effect the energization of the field winding as a function of the output of the magnetic amplifier, said magnetic amplifier having a control winding, a self-saturating second-stage magnetic amplifier having main windings connected to suitably energized alternating-current terminals and connected to the control winding of the third-stage magnetic amplifier, said second-stage magnetic amplifier having a first control winding, a second control winding, a third control winding, and a fourth control winding, a first first-stage self-saturating magnetic amplifier having main windings connected to terminals energized from a suitable source of alternating current and being connected to the first control winding of the second-stage magnetic amplifier, said first first-stage magnetic amplifier having a first control winding and a second control winding, circuit means for connecting the second control winding of the second-stage magnetic amplifier and the first control winding of the first-stage magnetic amplifier to be responsive to the generator voltage, circuit means for connecting the third control winding of the second-stage magnetic amplifier and the second control winding of the first-stage magnetic amplifier to be responsive to the generator armature current, a second first-stage magnetic amplifier similar to the first first-stage magnetic amplifier and having similar main windings similarly energized and having similar control windings except that the effective winding direction is reversed with respect to the magnetic amplifier core so that an effective output in the main windings is produced only when the generator voltage is reversed, and circuit means for connecting the main windings of the second first-stage magnetic amplifier to the fourth control winding of the second-stage magnetic amplifier.

14. In a system of control for a winder drive, in combination, a main generator having an armature winding and a field winding the excitation of which is to be controlled, a plurality of motors disposed to be connected to the armature winding of the generator, controller means for effecting the connection of the motors in selected sequence to the generator armature winding, a self-saturating third-stage magnetic amplifier having main windings connected to suitably energized alternating-current terminals and connected to the generator field to thus effect the energization of the field winding as a function of the output of the magnetic amplifier, said magnetic amplifier having a control winding, a self-saturating second-stage magnetic amplifier having main windings connected to suitably energized alternating-current terminals and connected to the control winding of the third-stage magnetic amplifier, said second-stage magnetic amplifier having a first control winding and a second control winding, a self-saturating first-stage magnetic amplifier having main windings connected to terminals energized from a suitable source of alternating current and connected to the first control winding of the second-stage magnetic amplifier, said first-stage magnetic amplifier having a control winding, and circuit means for connecting the second control winding of the second-stage magnetic amplifier and the control winding of the first-stage magnetic amplifier to be responsive to the voltage of the generator, and manually operable means for at will varying the amplifying level of said first-stage and second-stage magnetic amplifiers to thus vary the output of the first mentioned magnetic amplifier over any selected range.

15. In a system of control for a winder drive, in combination, a main generator having an armature winding and a field winding the excitation of which is to be controlled, a plurality of motors disposed to be connected to the armature winding of the generator, controller means for effecting the connection of the motors in selected sequence to the generator armature winding, a self-saturating third-stage magnetic amplifier having main windings connected to suitably energized alternating-current terminals and connected to the generator field to thus effect the energization of the field winding as a function of the output of the magnetic amplifier, said magnetic amplifier having a control winding, a self-saturating second-stage magnetic amplifier having main windings connected to suitably energized alternating-current terminals and connected to the control winding of the third-stage magnetic amplifier, said second-stage magnetic amplifier having a first control winding, a second control winding, and a third control winding, a first-stage self-saturating magnetic amplifier having main windings connected to terminals energized from a suitable source of alternating current and being connected to the first control winding of the second-stage magnetic amplifier, said first-stage magnetic amplifier having a first control winding and a second control winding, circuit means for connecting the second control winding of the second-stage magnetic amplifier and the first control winding of the first-stage magnetic amplifier to be responsive to the generator voltage, circuit means for connecting the third control winding of the second-stage magnetic amplifier and the second control winding of the first-stage magnetic amplifier to be responsive to the generator armature current, and manually operable means for at will varying the amplifying level of the first-stage and the second-stage magnetic amplifiers to thus vary the output of the first mentioned magnetic amplifier over any selected range.

16. In a system of control for a winder drive, in combination, a main generator having an armature winding and a field winding the excitation of which is to be controlled, a plurality of motors disposed to be connected to the armature winding of the generator, controller means for effecting the connection of the motors in selected sequence to the generator armature winding, a self-saturating third-stage magnetic amplifier having main windings connected to suitably energized alternating-current terminals and connected to the generator field to thus effect the energization of the field winding as a function of the output of the magnetic amplifier, said magnetic amplifier having a control winding, a self-saturating second-stage magnetic amplifier having main windings connected to suitably energized alternating-current terminals and connected to the control winding of the third-stage magnetic amplifier, said second-stage magnetic amplifier having a first control winding, a second control winding, a third control winding, and a fourth control winding, a first first-stage self-saturating magnetic amplifier having main windings connected to terminals energized from a suitable source of alternating current and being connected to the first control winding of the second-stage magnetic amplifier, said first first-stage magnetic amplifier having a first control winding and a second control winding, circuit means for connecting the second control winding of the second-stage magnetic amplifier and the first control winding of the first-stage magnetic amplifier to be responsive to the generator voltage, circuit means for connecting the third control winding of the second-stage magnetic amplifier and the second control winding of the first-stage magnetic amplifier to be responsive to the generator armature current, a second first-stage magnetic amplifier similar to the first first-stage magnetic amplifier and having similar main windings similarly energized and having similar control windings except that the effective winding direction is reversed with respect to magnetic amplifier core so that an effective output in the main windings is produced only when the generator voltage is reversed, and circuit means for connecting the main windings of the second first-stage magnetic amplifier to the fourth control winding of the second-stage magnetic amplifier, and manually operable means for at will varying the amplifying level of the second-stage magnetic amplifier and both the first and second first-stage magnetic amplifiers to thus vary the output of the first mentioned magnetic amplifier.

References Cited in the file of this patent

UNITED STATES PATENTS

| 2,504,105 | Bendz | Apr. 18, 1950 |
| 2,542,843 | Shaw | Feb. 20, 1951 |
| 2,627,597 | Johansson | Feb. 3, 1953 |

OTHER REFERENCES

"Controllers for Electric Motors," James & Markle, McGraw-Hill, 1952, Figs. 13–17, p. 213.

"Saturating Core Devices," Crow, published by Universal Scientific Co., Inc., Figs. 11–13, p. 285.